US011768590B2

(12) United States Patent
Richter et al.

(10) Patent No.: US 11,768,590 B2
(45) Date of Patent: Sep. 26, 2023

(54) CONFIGURING OBJECTIVE-EFFECTUATORS FOR SYNTHESIZED REALITY SETTINGS

(71) Applicant: Apple Inc., Cupertino, CA (US)

(72) Inventors: Ian M. Richter, Los Angeles, CA (US); Jack Greasley, San Francisco, CA (US); Brian E. Goldberg, San Carlos, CA (US); Eric A. Soulvie, San Jose, CA (US); Jeremy R. Bernstein, San Francisco, CA (US); Bradley Warren Peebler, Emerald Hills, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/959,333

(22) PCT Filed: Jan. 18, 2019

(86) PCT No.: PCT/US2019/014188
§ 371 (c)(1),
(2) Date: Jun. 30, 2020

(87) PCT Pub. No.: WO2019/143933
PCT Pub. Date: Jul. 25, 2019

(65) Prior Publication Data
US 2021/0042022 A1 Feb. 11, 2021

Related U.S. Application Data

(60) Provisional application No. 62/734,034, filed on Sep. 20, 2018, provisional application No. 62/734,034, filed on Sep. 20, 2018.

(51) Int. Cl.
*G06F 3/04845* (2022.01)
*G06F 3/0482* (2013.01)
(Continued)

(52) U.S. Cl.
CPC .......... *G06F 3/04845* (2013.01); *A63F 13/63* (2014.09); *A63F 13/79* (2014.09);
(Continued)

(58) Field of Classification Search
CPC . G06F 3/04845; G06F 3/0482; G06T 19/006; A63F 13/63; A63F 13/79; A63F 2300/5553
See application file for complete search history.

(56) References Cited

U.S. PATENT DOCUMENTS 6,545,682 B1 * 4/2003 Ventrella ................. G06F 3/011
345/473
9,884,254 B2 * 2/2018 Yim ........................ A63F 13/42
(Continued)

FOREIGN PATENT DOCUMENTS

CN 101276475 A 10/2008
CN 102486815 A 6/2012
(Continued)

OTHER PUBLICATIONS

Mateus Pelegrino, et al., "Creating and Designing customized and dynamic game interfaces using smartphones and touchscreen", 2014, IEEE computer society, all pages (Year: 2014).*
(Continued)

*Primary Examiner* — Roberto Borja
(74) *Attorney, Agent, or Firm* — Fernando & Partners, LLP

(57) ABSTRACT

In some implementations, a method includes obtaining a set of preselected attribute values for an objective-effectuator. In some implementations, the method includes while displaying a user interface including a plurality of configuration control affordances provided to effect configuration of one or more attributes characterizing the objective-effectuator, in response to receiving an input indicative of manipulation of
(Continued)

a first configuration control affordance, setting a corresponding first attribute to a particular preselected attribute value, and modifying display of the plurality of configuration control affordances in order to change the number of the plurality of configuration control affordances displayed. In some implementations, the method includes configuring the objective-effectuator at least based on the particular preselected attribute value of the first attribute. In some implementations, the objective-effectuator is associated with a set of predefined actions.

16 Claims, 16 Drawing Sheets

(51) Int. Cl.
*G06T 19/00* (2011.01)
*A63F 13/63* (2014.01)
*A63F 13/79* (2014.01)

(52) U.S. Cl.
CPC .......... *G06F 3/0482* (2013.01); *G06T 19/006* (2013.01); *A63F 2300/5553* (2013.01)

(56) References Cited

U.S. PATENT DOCUMENTS

| | | | |
|---|---|---|---|
| 10,699,462 B1* | 6/2020 | Baszucki | G07F 17/3272 |
| 2002/0082065 A1 | 6/2002 | Fogel et al. | |
| 2004/0053690 A1* | 3/2004 | Fogel | A63F 13/69 |
| | | | 463/31 |
| 2009/0147008 A1* | 6/2009 | Do | A63F 13/79 |
| | | | 345/473 |
| 2011/0022965 A1* | 1/2011 | Lawrence | G06F 3/011 |
| | | | 715/747 |
| 2011/0276918 A1* | 11/2011 | Bennett | G06F 3/0482 |
| | | | 715/811 |
| 2012/0023560 A1* | 1/2012 | Yanagi | G06F 21/645 |
| | | | 726/6 |
| 2016/0067604 A1 | 3/2016 | Yim et al. | |
| 2017/0312614 A1 | 11/2017 | Tran et al. | |
| 2018/0107367 A1* | 4/2018 | Rinneberg | G06F 3/0488 |
| 2019/0004783 A1* | 1/2019 | Fernandez | G06F 8/61 |
| 2019/0188773 A1* | 6/2019 | Chu | G06F 16/5866 |

FOREIGN PATENT DOCUMENTS

| | | |
|---|---|---|
| CN | 109589840 A | 1/2018 |
| JP | 2001100906 A | 4/2001 |
| JP | 2002224439 A | 8/2002 |
| JP | 2004127026 A | 4/2004 |

OTHER PUBLICATIONS

Don Caldwell, "You Cannot Fast Travel", May 31, 2017, Knowyourmeme.com, pp. 3-5 (Year: 2017).*
International Search Report and Written Opinion dated Jun. 12, 2019, International Application No. PCT/US2019/014188, pp. 1-16.
Pelegrino et al. "Creating and Designing Customized and Dynamic Game Interfaces Using Smartphones and Touchscreen", ResearchGate, Conference Paper, Nov. 2014, 8 pages.

* cited by examiner

CONFIGURING OBJECTIVE-EFFECTUATORS FOR SYNTHESIZED REALITY SETTINGS

TECHNICAL FIELD

The present disclosure generally relates to configuring objective-effectuators for synthesized reality settings.

BACKGROUND

Some devices are capable of generating and presenting synthesized reality settings. Some synthesized reality settings include virtual reality settings that are synthesized replacements of physical settings. Some synthesized reality settings include augmented reality settings that are modified versions of physical settings. Some devices that present synthesized reality settings include mobile communication devices such as smartphones, head-mountable displays (HMDs), eyeglasses, heads-up displays (HUDs), and optical projection systems. Some previously available devices are ineffective at presenting synthesized reality settings, and many previously available devices are ineffective at configuring synthesized reality settings.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1A:
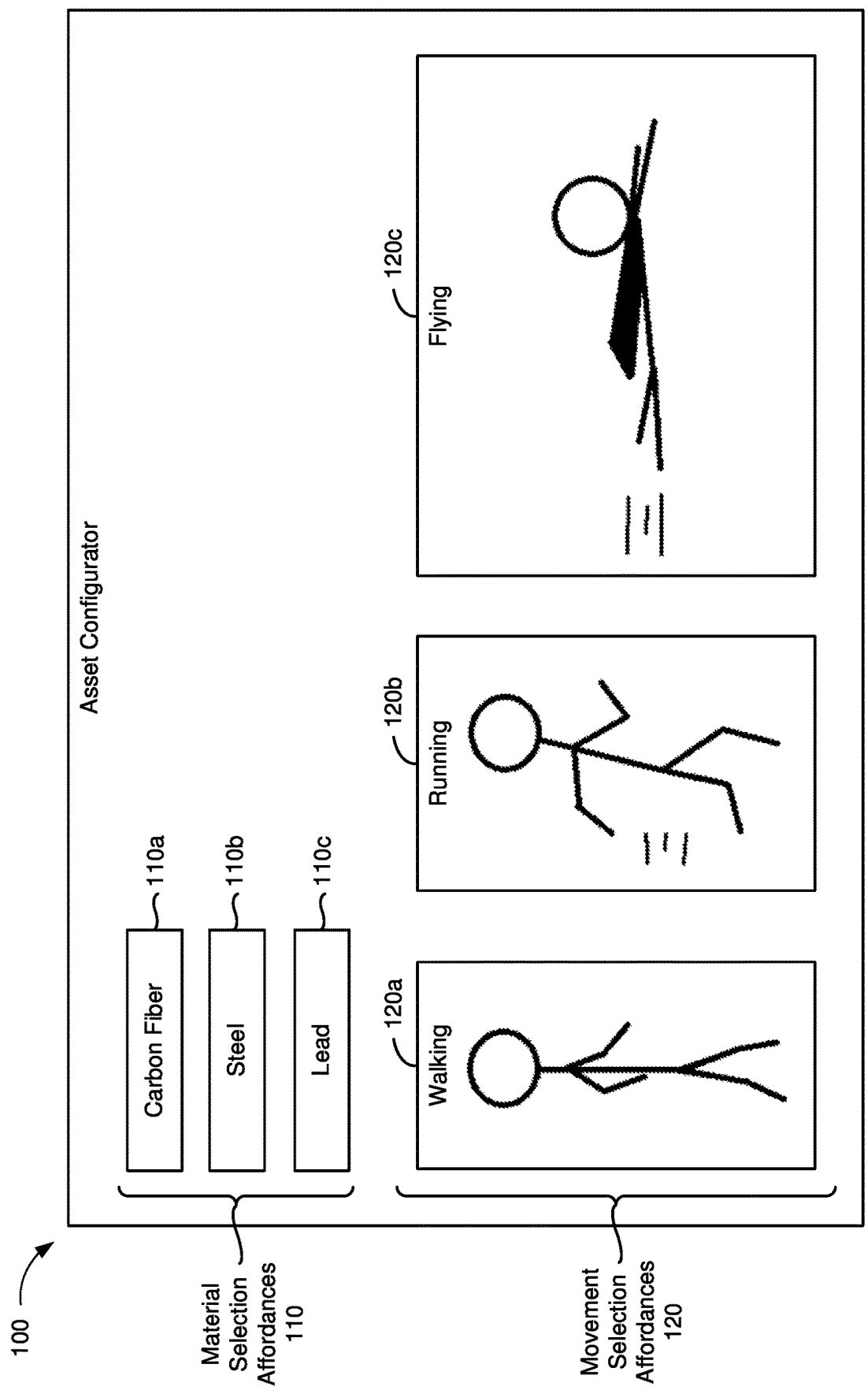
FIGS. 1A-1G are diagrams of an example user interface for configuring an objective-effectuator in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for configuring objective-effectuators for synthesized reality settings. In various implementations, a device includes a non-transitory memory and one or more processors coupled with the non-transitory memory. In some implementations, a method includes obtaining a set of preselected attribute values for an objective-effectuator. In some implementations, the method includes while displaying a user interface including a plurality of configuration control affordances provided to effect configuration of one or more attributes characterizing the objective-effectuator, in response to receiving an input indicative of manipulation of a first configuration control affordance, setting a corresponding first attribute to a particular preselected attribute value, and modifying display of the plurality of configuration control affordances in order to change the number of the plurality of configuration control affordances displayed. In some implementations, the method includes configuring the objective-effectuator at least based on the particular preselected attribute value of the first attribute. In some implementations, the objective-effectuator is associated with a set of predefined actions.

In various implementations, a method includes obtaining a request to create an objective-effectuator for a synthesized reality setting. In some implementations, the request indicates a set of attribute values for the objective-effectuator. In some implementations, the method includes determining whether the set of attribute values indicated in the request satisfy a set of preselected attribute values for the objective-effectuator. In some implementations, the method includes in response to determining that the set of attribute values indicated in the request satisfy the set of preselected attribute values for the objective-effectuator, generating the objective-effectuator based on the set of attribute values indicated in the request. In some implementations, the method includes transmitting a data container that includes the objective-effectuator.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical setting refers to a world that individuals can sense and/or with which individuals can interact without assistance of electronic systems. Physical settings (e.g., a physical forest) include physical elements (e.g., physical trees, physical structures, and physical animals). Individuals can directly interact with and/or sense the physical setting, such as through touch, sight, smell, hearing, and taste.

In contrast, a synthesized reality (SR) setting refers to an entirely or partly computer-created setting that individuals can sense and/or with which individuals can interact via an electronic system. In SR, a subset of an individual's movements is monitored, and, responsive thereto, one or more attributes of one or more virtual objects in the SR setting is changed in a manner that conforms with one or more physical laws. For example, a SR system may detect an individual walking a few paces forward and, responsive thereto, adjust graphics and audio presented to the individual in a manner similar to how such scenery and sounds would change in a physical setting. Modifications to attribute(s) of virtual object(s) in a SR setting also may be made responsive to representations of movement (e.g., audio instructions).

An individual may interact with and/or sense a SR object using any one of his senses, including touch, smell, sight, taste, and sound. For example, an individual may interact with and/or sense aural objects that create a multi-dimensional (e.g., three dimensional) or spatial aural setting, and/or enable aural transparency. Multi-dimensional or spatial aural settings provide an individual with a perception of discrete aural sources in multi-dimensional space. Aural transparency selectively incorporates sounds from the physical setting, either with or without computer-created audio. In some SR settings, an individual may interact with and/or sense only aural objects.

One example of SR is virtual reality (VR). A VR setting refers to a simulated setting that is designed only to include computer-created sensory inputs for at least one of the senses. A VR setting includes multiple virtual objects with which an individual may interact and/or sense. An individual may interact and/or sense virtual objects in the VR setting through a simulation of a subset of the individual's actions within the computer-created setting, and/or through a simulation of the individual or his presence within the computer-created setting.

Another example of SR is mixed reality (MR). A MR setting refers to a simulated setting that is designed to integrate computer-created sensory inputs (e.g., virtual objects) with sensory inputs from the physical setting, or a representation thereof. On a reality spectrum, a mixed reality setting is between, and does not include, a VR setting at one end and an entirely physical setting at the other end.

In some MR settings, computer-created sensory inputs may adapt to changes in sensory inputs from the physical setting. Also, some electronic systems for presenting MR settings may monitor orientation and/or location with respect to the physical setting to enable interaction between virtual objects and real objects (which are physical elements from the physical setting or representations thereof). For example, a system may monitor movements so that a virtual plant appears stationery with respect to a physical building.

One example of mixed reality is augmented reality (AR). An AR setting refers to a simulated setting in which at least one virtual object is superimposed over a physical setting, or a representation thereof. For example, an electronic system may have an opaque display and at least one imaging sensor for capturing images or video of the physical setting, which are representations of the physical setting. The system combines the images or video with virtual objects, and displays the combination on the opaque display. An individual, using the system, views the physical setting indirectly via the images or video of the physical setting, and observes the virtual objects superimposed over the physical setting. When a system uses image sensor(s) to capture images of the physical setting, and presents the AR setting on the opaque display using those images, the displayed images are called a video pass-through. Alternatively, an electronic system for displaying an AR setting may have a transparent or semi-transparent display through which an individual may view the physical setting directly. The system may display virtual objects on the transparent or semi-transparent display, so that an individual, using the system, observes the virtual objects superimposed over the physical setting. In another example, a system may comprise a projection system that projects virtual objects into the physical setting. The virtual objects may be projected, for example, on a physical surface or as a holograph, so that an individual, using the system, observes the virtual objects superimposed over the physical setting.

An augmented reality setting also may refer to a simulated setting in which a representation of a physical setting is altered by computer-created sensory information. For example, a portion of a representation of a physical setting may be graphically altered (e.g., enlarged), such that the altered portion may still be representative of but not a faithfully-reproduced version of the originally captured image(s). As another example, in providing video pass-through, a system may alter at least one of the sensor images to impose a particular viewpoint different than the viewpoint captured by the image sensor(s). As an additional example, a representation of a physical setting may be altered by graphically obscuring or excluding portions thereof.

Another example of mixed reality is augmented virtuality (AV). An AV setting refers to a simulated setting in which a computer-created or virtual setting incorporates at least one sensory input from the physical setting. The sensory input(s) from the physical setting may be representations of at least one characteristic of the physical setting. For example, a virtual object may assume a color of a physical element captured by imaging sensor(s). In another example, a virtual object may exhibit characteristics consistent with actual weather conditions in the physical setting, as identified via imaging, weather-related sensors, and/or online weather data. In yet another example, an augmented reality forest may have virtual trees and structures, but the animals may have features that are accurately reproduced from images taken of physical animals.

Many electronic systems enable an individual to interact with and/or sense various SR settings. One example includes head mounted systems. A head mounted system may have an opaque display and speaker(s). Alternatively, a head mounted system may be designed to receive an external display (e.g., a smartphone). The head mounted system may have imaging sensor(s) and/or microphones for taking images/video and/or capturing audio of the physical setting, respectively. A head mounted system also may have a transparent or semi-transparent display. The transparent or semi-transparent display may incorporate a substrate through which light representative of images is directed to an individual's eyes. The display may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one embodiment, the transparent or semi-transparent display may transition selectively between an opaque state and a transparent or semi-transparent state. In another example, the electronic system may be a projection-based system. A projection-based system may use retinal projection to project images onto an individual's retina. Alternatively, a projection system also may project virtual objects into a physical setting (e.g., onto a physical surface or as a holograph). Other examples of SR systems include heads up displays, automotive windshields with the ability to display graphics, windows with the ability to display graphics, lenses with the ability to display graphics, headphones or earphones, speaker arrangements, input mechanisms (e.g., controllers having or not having haptic feedback), tablets, smartphones, and desktop or laptop computers.

The present disclosure provides methods, systems, and/or devices for configuring objective-effectuators for synthesized reality settings. In particular, the present disclosure provides methods, systems, and/or devices that allow a user to configure an objective-effectuator of an asset while enabling an entity that owns the asset to enforce restrictions on the configuration of the objective-effectuator. A user interface guides the user towards configurations that satisfy the restrictions placed by the entity that owns the asset. The user interface changes the number of configuration control affordances thereby guiding the user towards a configuration that is permitted and away from configurations that are not permitted.

FIGS. 1A-1G are diagrams of an example user interface 100 that allows a user to configure objective-effectuators. As used herein, in various implementations, an objective-effectuator refers to a character/equipment representation that can be instantiated in a synthesized reality setting, or an environment of the synthesized reality setting. In various implementations, an objective-effectuator performs one or more actions in order to effectuate (e.g., complete, satisfy, or achieve) one or more objectives. While pertinent features are shown, those of ordinary skill in the art will appreciate from the present disclosure that various other features have not been illustrated for the sake of brevity and so as not to obscure more pertinent aspects of the example implementations disclosed herein. In the example of FIG. 1A, the user interface 100 allows the user to configure an objective-effectuator that corresponds to an action figure from fictional material. In other words, in the example of FIG. 1A, the objective-effectuator is a representation of a character from fictional material. To that end, as a non-limiting example, the user interface 100 includes various configuration control affordances such as material selection affordances 110 and movement selection affordances 120.

In the example of FIGS. 1A-1G, the material selection affordances 110 enable selection of a material for the objective-effectuator. To that end, the material selection affordances 110 include a carbon fiber selection affordance 110a, a steel selection affordance 110b, and a lead selection affordance 110c. A selection of the carbon fiber selection affordance 110a results in the objective-effectuator being made from carbon fiber. A selection of the steel selection affordance 110b results in the objective-effectuator being made from steel. A selection of the lead selection affordance 110c results in the objective-effectuator being made from lead.

In the example of FIGS. 1A-1G, the movement selection affordances 120 enable selection of movement type for the objective-effectuator. To that end, the movement selection affordances 120 include a walking selection affordance 120a, a running selection affordance 120b, and a flying selection affordance 120c. A selection of the walking selection affordance 120a results in the objective-effectuator utilizing walking as its way of moving. A selection of the running selection affordance 120b results in the objective-effectuator utilizing running as its way of moving. A selection of the flying selection affordance 120c results in the objective-effectuator utilizing flying as its way of moving.

In the example of FIGS. 1A-1G, the selectability of the movement selection affordances 120 is based on the selection of the material selection affordances 110. For example, in some implementations, an entity that creates/owns the action figure provides rules that restrict the selectability of the movement selection affordances 120 based on the selection of the material selection affordances 110. In some implementations, the rules collectively form a rules engine (e.g., the rules engine 218 shown in FIG. 2). In some implementations, the rules affecting the selectability of the movement selection affordances 120 are:

| Rule # | Material selection affordance 110 that has been selected | Movement selection affordances 120 that are available for selection |
|---|---|---|
| 1 | Carbon fiber selection affordance 110a | Walking selection affordance 120a<br>Running selection affordance 120b<br>Flying selection affordance 120c |
| 2 | Steel selection affordance 110b | Walking selection affordance 120a<br>Running selection affordance 120b |
| 3 | Lead selection affordance 110c | Walking selection affordance 120a |

Figure 1B:
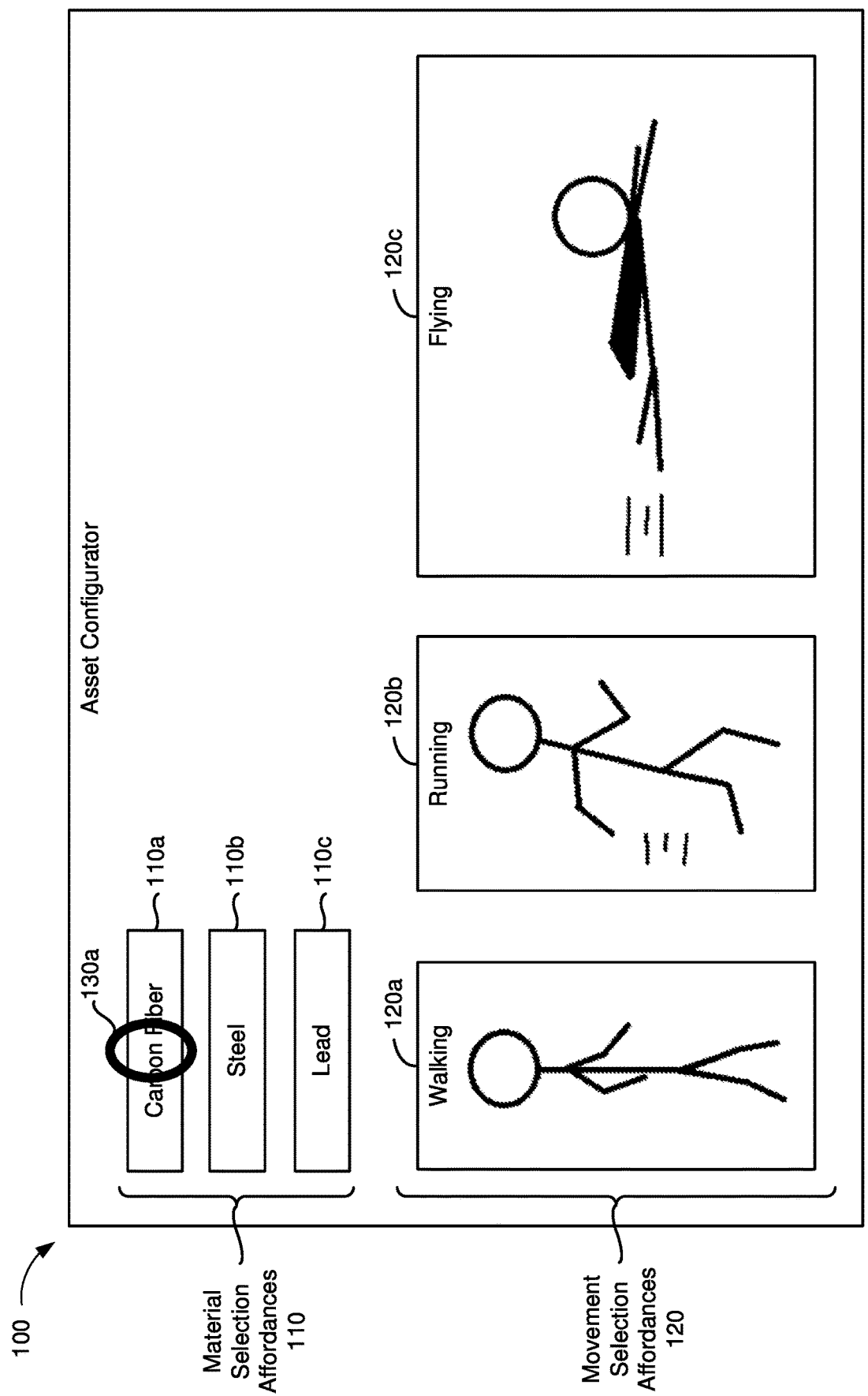
Figure 1C:
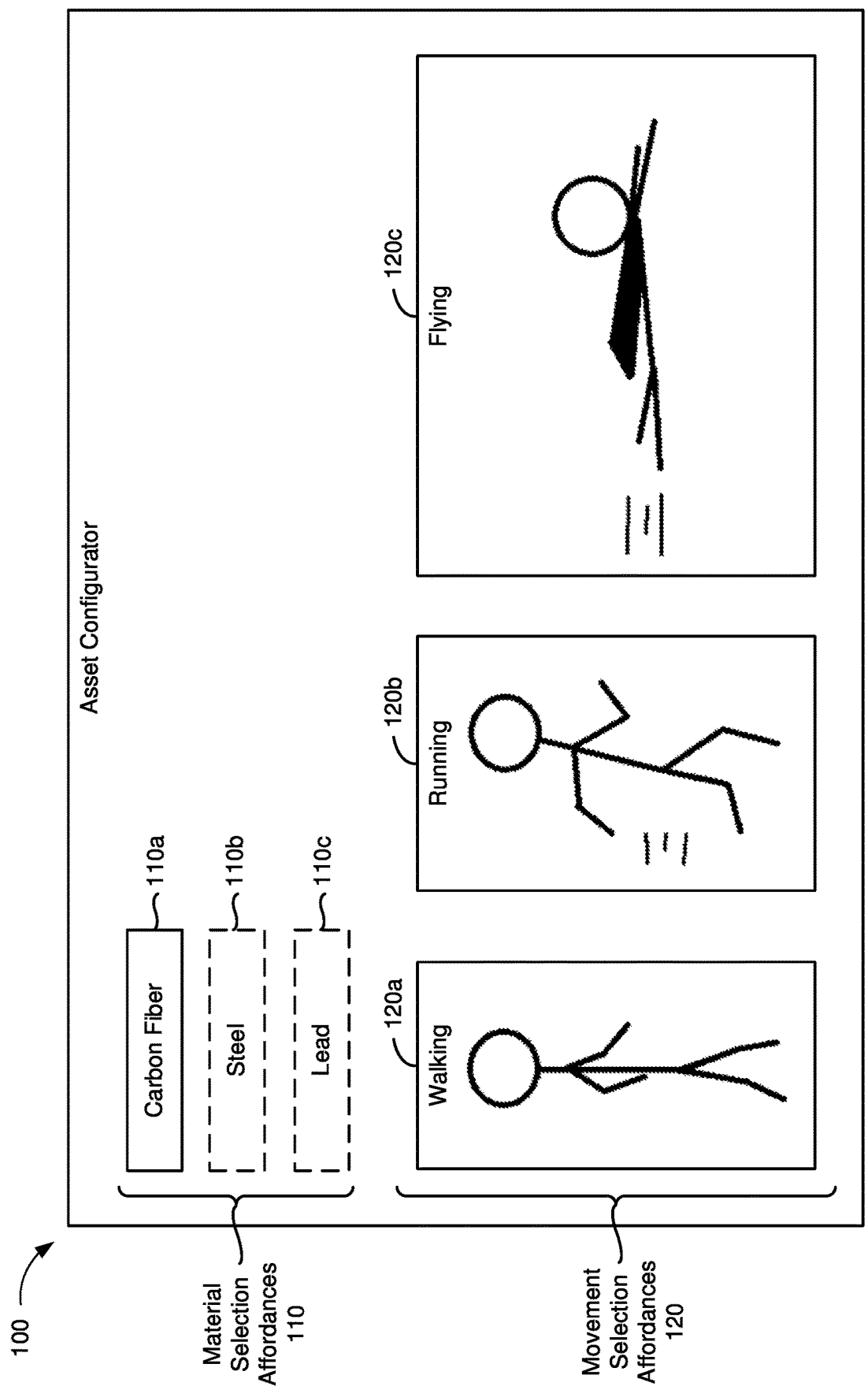

Referring to FIG. 1B, the user interface 100 receives a user input 130a selecting the carbon fiber selection affordance 110a. The user input 130a indicates that the user has selected carbon fiber as the material with which to build the objective-effectuator. As illustrated in FIG. 1C, according to Rule 1, a selection of the carbon fiber selection affordance 110a results in all movement selection affordances 120 being selectable. As such, in the example of FIG. 1C, the walking selection affordance 120a, the running selection affordance 120b, and the flying selecting affordance 120c are available for selection after the carbon fiber selection affordance 110a has been selected.

Figure 1D:
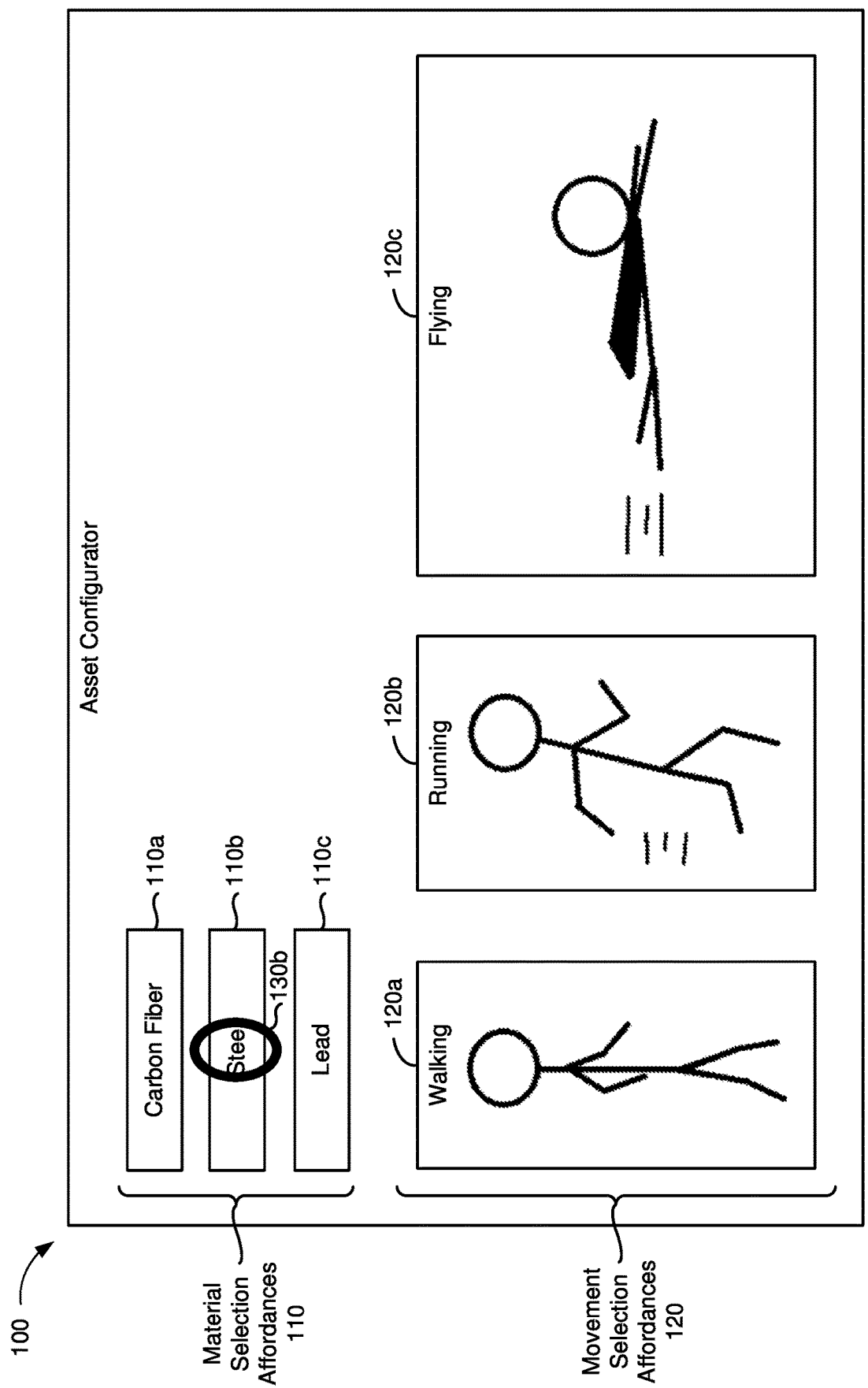
Figure 1E:
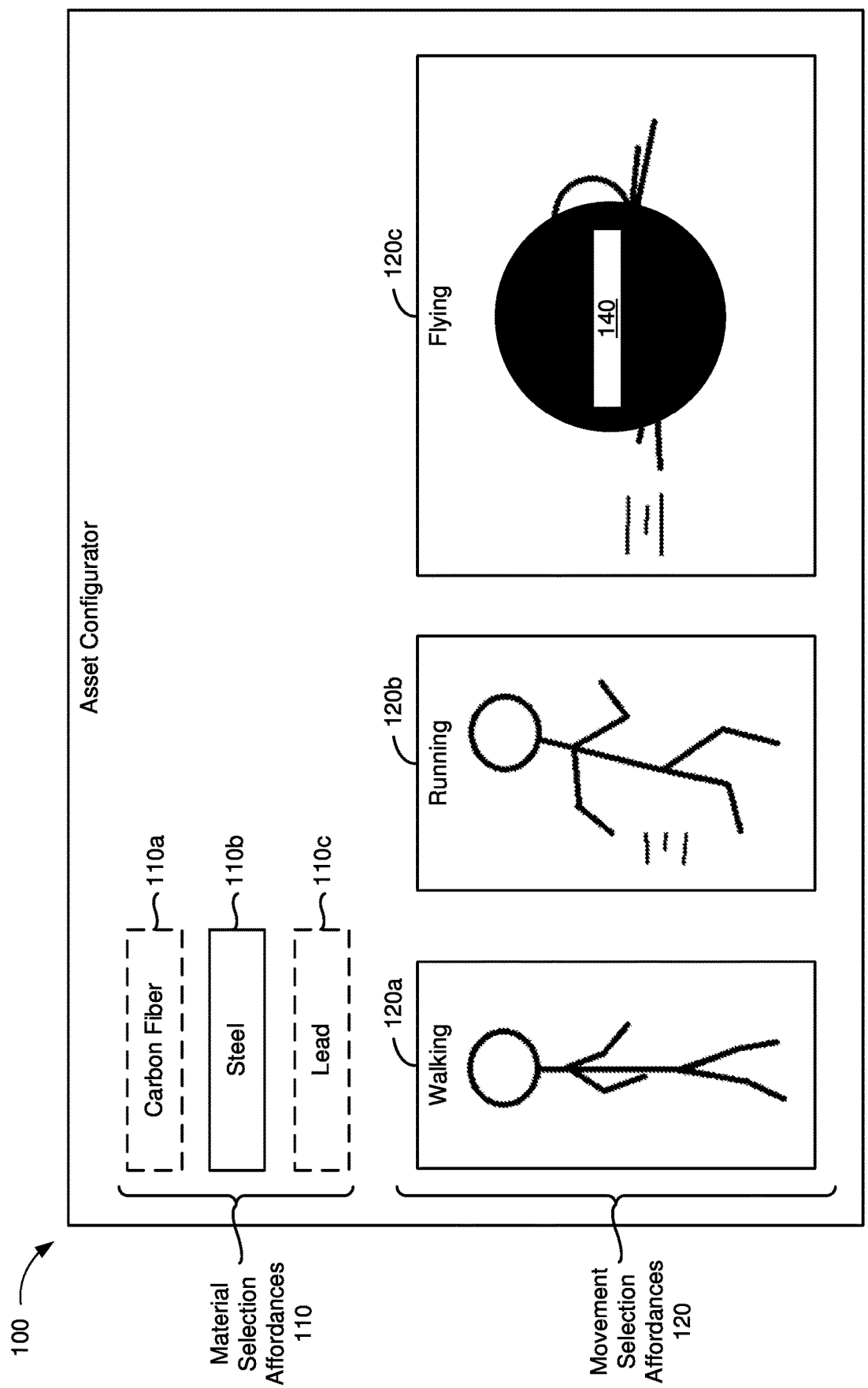

Referring to FIG. 1D, the user interface 100 receives a user input 130b selecting the steel selection affordance 110b. The user input 130b indicates that the user has selected steel as the material with which to build the objective-effectuator. As illustrated in FIG. 1E, according to Rule 2, a selection of the steel selection affordance 110b results in the flying selection affordance 120c being unselectable, and the walking selection affordance 120a and the running selection affordance 120b being selectable. In the example of FIG. 1E, the user interface 100 overlays an unselectable affordance indicator 140 on the flying selection affordance 120c in order to indicate that the flying selection affordance 120c is no longer selectable. In various implementations, the user interface 100 changes a visual property of the flying selection affordance 120c in order to indicate that the flying selection affordance 120c is not selectable (e.g., the user interface 100 changes a background color of the flying selection affordance 120c by, for example, graying out the flying selection affordance 120c in order to indicates its unselectability).

Figure 1F:
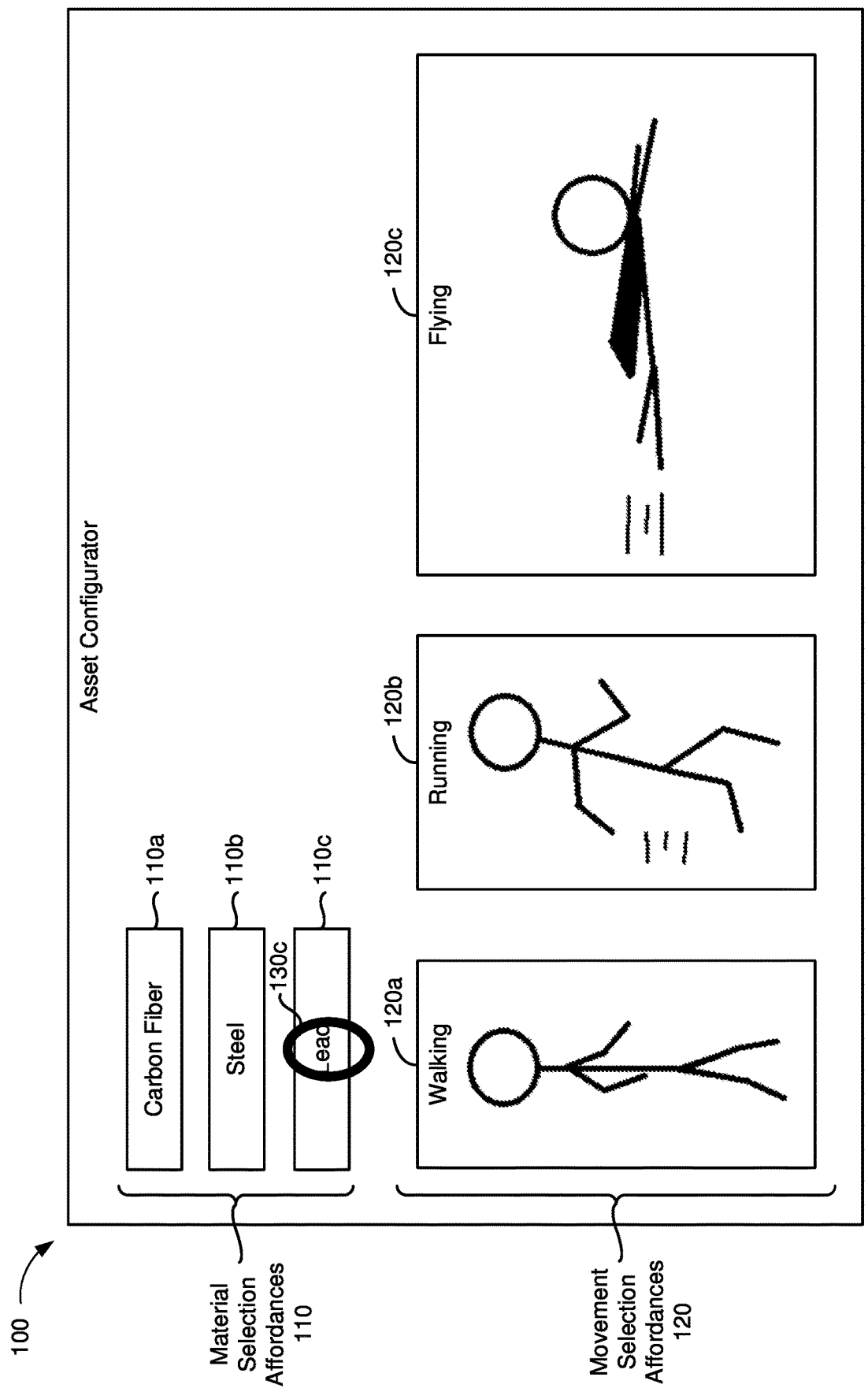
Figure 1G:
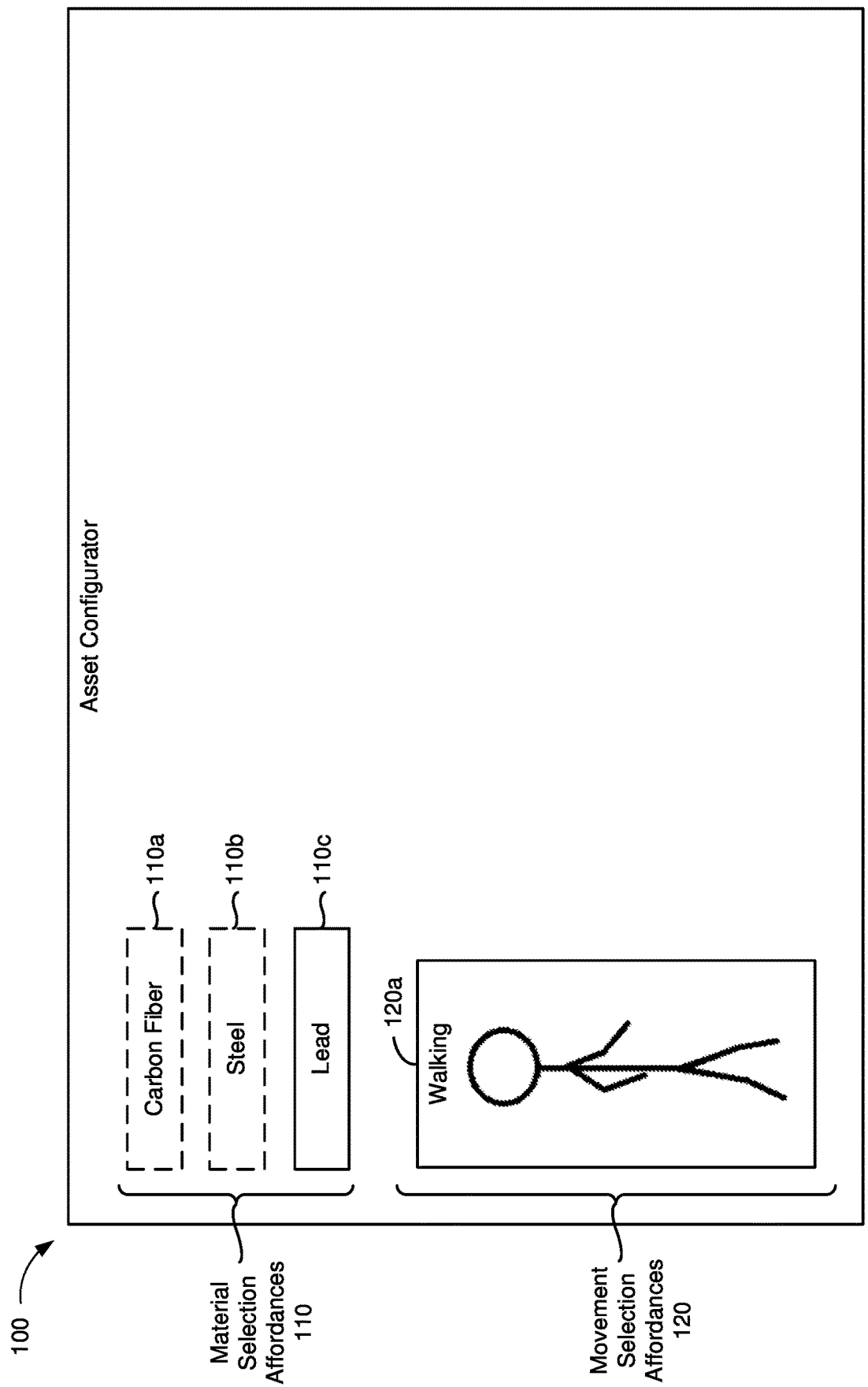

Referring to FIG. 1F, the user interface 100 receives a user input 130c selecting the lead selection affordance 110c. The user input 130c indicates that the user has selected lead as the material with which to build the objective-effectuator. As illustrated in FIG. 1G, according to Rule 3, a selection of the lead selection affordance 110c results in the running selection affordance 120b and the flying selection affordance 120c being unselectable, and the walking selection affordance 120a being selectable. In the example of FIG. 1G, the user interface 100 removes the running selection affordance 120*b* and the flying selection affordance 120*c* in order to indicate that the running selection affordance 120*b* and the flying selection affordance 120*c* are no longer selectable. In various implementations, the user interface 100 changes a visual property of the running selection affordance 120*b* and the flying selection affordance 120*c* in order to indicate that the running selection affordance 120*b* and the flying selection affordance 120*c* are not selectable (e.g., the user interface 100 occludes the running selection affordance 120*b* and the flying selection affordance 120*c* in order to indicate their unselectability, for example, by overlaying (not shown) the unselectable affordance indicator 140 on the running selection affordance 120*b* and the flying selection affordance 120*c*).

In various implementations, the user interface 100 allows the user to configure the objective-effectuator while enabling an asset creator (e.g., an entity that created an asset represented by the objective-effectuator) to enforce restrictions on the configurations of the objective-effectuator via the rules. In the example of FIGS. 1A-1G, the user interface 100 allows the user to configure the objective-effectuator to move in different ways while allowing the asset creator to restrict certain movements for specific materials. For example, Rule 3 allows the asset creator to restrict an objective-effectuator made of lead from running or flying because the relatively high weight of lead makes the objective-effectuator too heavy to run or fly. As such, in various implementations, the user interface 100 enables configurations that result in more realistic/sensible objective-effectuators.

Figure 2:
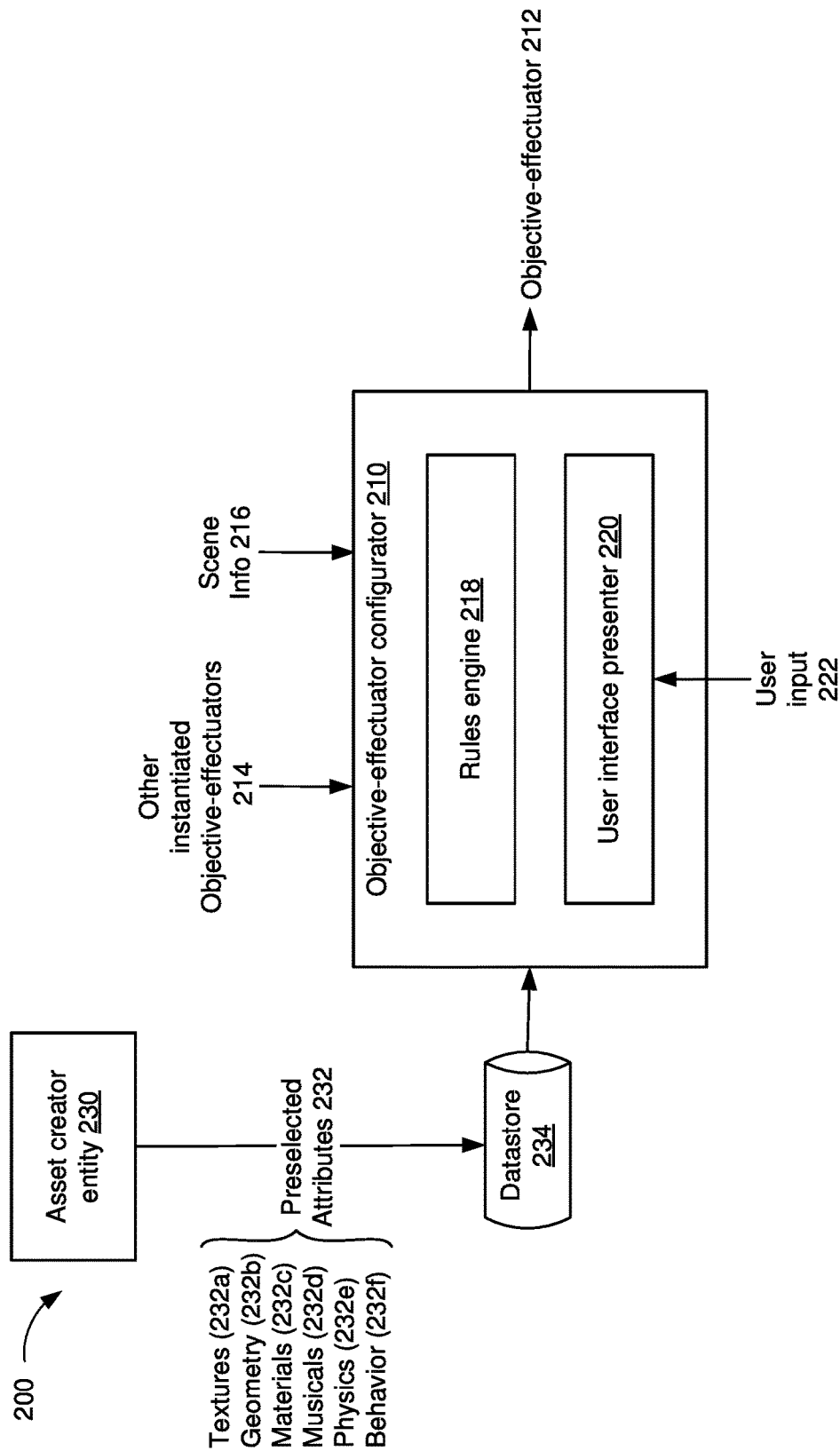
FIG. 2 is a block diagram of an example objective-effectuator configurator for configuring an objective-effectuator in accordance with some implementations.

FIG. 2 is a block diagram of an example system 200 for configuring objective-effectuators in accordance with some implementations. In various implementations, the system 200 includes an objective-effectuator configurator 210 that configures an objective-effectuator 212 based on a user input 222. In various implementations, the objective-effectuator configurator 210 includes a rules engine 218 and a user interface presenter 220.

In various implementations, the rules engine 218 includes one or more rules for configuring the objective-effectuator 212 (e.g., the Rules 1-3 described herein). In some implementations, the rules are provided by an asset creator entity 230 that creates/owns the asset that the objective-effectuator 212 represents. For example, in some implementations, the rules are provided by an asset creator entity 230 that creates a character/equipment represented by the objective-effectuator 212.

In various implementations, the user interface presenter 220 presents a user interface (e.g., the user interface 100 shown in FIGS. 1A-1G) that allows a user to configure the objective-effectuator 212. In some implementations, the user interface includes various configuration control affordances (e.g., the material selection affordances 110 and/or the movement selection affordances 120 shown in FIGS. 1A-1G) that enable configuration of the objective-effectuator 212. To that end, the user interface presenter 220 receives the user input 222 (e.g., the user input 130*a* shown in FIG. 1B, the user input 130*b* shown in FIG. 1D, or the user input 130*c* shown in FIG. 1F) indicating a requested configuration for the objective-effectuator 212.

In various implementations, the user interface presenter 220 modifies the user interface based on the user input 222 and the rules provided by the rules engine 218. For example, in some implementations, the user interface presenter 220 changes a number of configuration control affordances that are selectable based on the user input 222 and the rules specified by the rules engine 218. For example, referring to FIGS. 1D-1E, in response to a selection of the steel selection affordance 110*b*, in accordance with Rule 2, the user interface presenter 220 reduces the number of movement selection affordances 120 that remain selectable.

In various implementations, the user interface presenter 220 modifies the display of the configuration control affordances. For example, in some implementations, the user interface presenter 220 changes the number of configuration control affordances. In some implementations, the user interface presenter 220 increases the number of configuration control affordances. In some implementations, the user interface presenter 220 decreases the number of configuration control affordances. In some implementations, the user interface presenter 220 modifies the display of the configuration control affordances by changing a visual property of at least some of the configuration control affordances. For example, in some implementations, the user interface presenter 220 overlays the unselectable affordance indicator 140 (shown in FIG. 1E) on the configuration control affordances that are no longer selectable. In some implementations, the user interface presenter 220 changes a font and/or a color (e.g., a background color) of a configuration control affordance in order to indicate that the configuration control affordance cannot be selected. For example, in some implementations, the user interface presenter 220 grays out a configuration control affordance in order to indicate that the configuration control affordance is unselectable.

In various implementations, the asset creator entity 230 provides preselected attributes 232 for the objective-effectuator 212. In some implementations, the preselected attributes 232 include preselected textures 232*a*, preselected geometry 232*b*, preselected materials 232*c*, preselected musicals 232*d*, preselected physics 232*e*, and/or preselected behavior 232*f*. In some implementations, the asset creator entity 230 stores the preselected attributes 232 in a datastore 234 that is accessible to the objective-effectuator configurator 210. In such implementations, the user interface presenter 220 presents configuration control affordances that enable selection of one or more of the preselected attributes 232 provided by the asset creator entity 230.

In some implementations, the objective-effectuator configurator 210 receives information 214 indicating other objective-effectuators that are instantiated in a synthesized reality setting. In such implementations, the rules engine 218 utilizes rules to determine which of the preselected attributes 232 are selectable based on the information 214 regarding the other instantiated objective-effectuators. For example, if the information 214 indicates that some of the other objective-effectuators instantiated in the synthesized reality setting are known to be hostile, then the rules engine 218 changes the selectability of the preselected materials 232*c* (e.g., less protective materials such as cotton are no longer selectable, but more protective materials such as steel remain or become selectable). In this example, the user interface presenter 220 modifies the display of the configuration control affordances in order to indicate the change in the selectability of the preselected materials 232*c* (e.g., the user interface presenter 220 makes the configuration control affordance for cotton unselectable, but makes or leaves the configuration control affordance for steel selectable).

In some implementations, the objective-effectuator configurator 210 receives scene information 216 corresponding to a synthesized reality setting. In some implementations, the scene information 216 indicates dimensions, shape, location, and/or a terrain associated with the synthesized reality setting. In such implementations, the rules engine 218 utilizes rules to determine which of the preselected attributes 232 are selectable based on the scene information 216. For example, if the scene information 216 indicates that the weather within the synthesized reality setting is hot, then the rules engine 218 changes the selectability of the preselected materials 232c (e.g., warmer materials such as wool are no longer selectable, but cooler materials such as cotton become or remain selectable). In this example, the user interface presenter 220 modifies the display of the configuration control affordances in order to indicate the change in the selectability of the preselected materials 232c (e.g., the user interface presenter 220 makes the configuration control affordance for wool unselectable, but makes or leaves the configuration control affordance for cotton selectable).

Figure 3A:
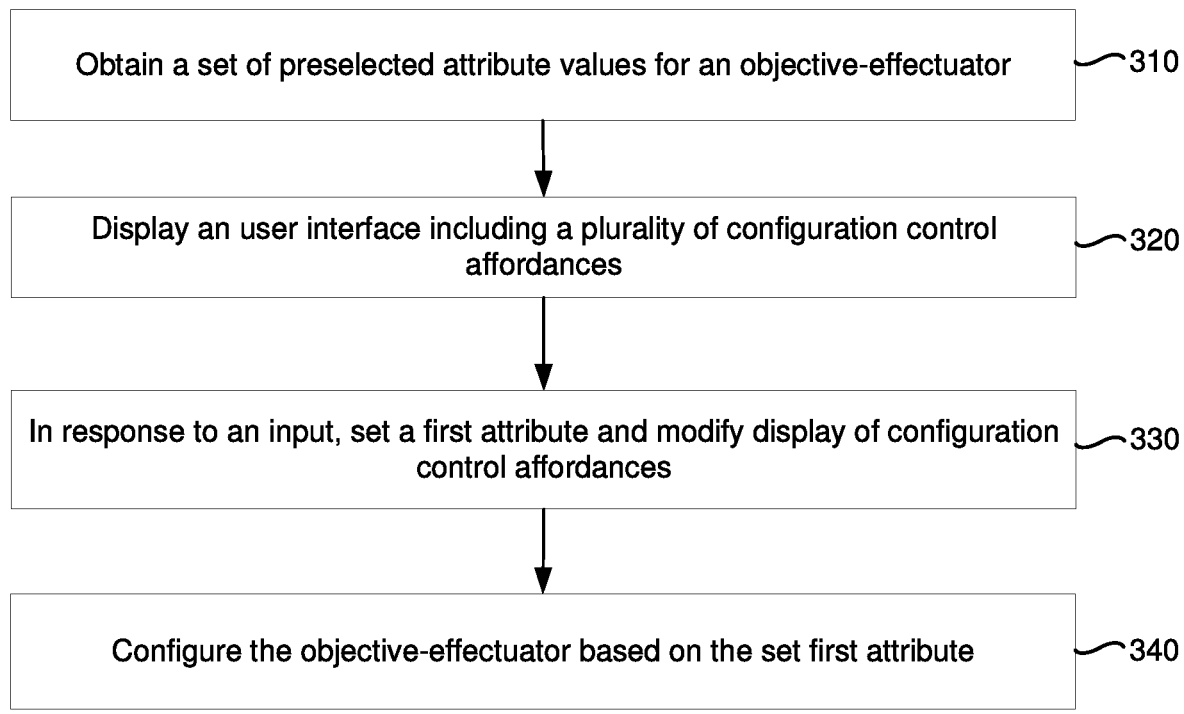
FIGS. 3A-3D are flowchart representations of a method of configuring an objective-effectuator in accordance with some implementations.

FIG. 3A is a flowchart representation of a method 300 of configuring an objective-effectuator for a synthesized reality setting. In various implementations, the method 300 is performed by a device with a non-transitory memory and one or more processors coupled with the non-transitory memory. In some implementations, the method 300 is performed by processing logic, including hardware, firmware, software, or a combination thereof. In some implementations, the method 300 is performed by a processor executing code stored in a non-transitory computer-readable medium (e.g., a memory). Briefly, in some implementations, the method 300 includes obtaining a set of preselected attribute values for an objective-effectuator, displaying a user interface including a plurality of configuration control affordances, setting a first attribute and modifying display of configuration control affordances, and configuring the objective-effectuator based on the first attribute.

As represented by block 310, in various implementations, the method 300 includes obtaining a set of preselected attribute values for an objective-effectuator. For example, referring to FIG. 2, the method 300 includes obtaining (e.g., receiving) the preselected attributes 232 from the asset creator entity 230.

As represented by block 320, in some implementations, the method 300 includes displaying a user interface including a plurality of configuration control affordances provided to effect configuration of one or more attributes characterizing the objective-effectuator. For example, referring to FIGS. 1A-1G, the method 300 includes displaying the user interface 100 with the material selection affordances 110 to enable selection of a material (e.g., carbon fiber, steel, or lead) and the movement selection affordances 120 to enable selection of a movement (e.g., walking, running, or flying).

As represented by block 330, in some implementations, the method 300 includes in response to receiving an input indicative of manipulation of a first configuration control affordance, setting a corresponding first attribute to a particular preselected attribute value. For example, referring to FIG. 1B, in response to receiving the user input 130a indicative of manipulation of the carbon fiber selection affordance 110a, the method 300 includes setting the material for the objective-effectuator to carbon fiber. In some implementations, the method 300 includes modifying display of the plurality of configuration control affordances in order to change the number of the plurality of configuration control affordances displayed. For example, referring to FIG. 1G, in response to receiving a selection of the lead selection affordance 110c, the running selection affordance 120b and the flying selection affordance 120c have been removed.

As represented by block 340, in some implementations, the method 300 includes configuring the objective-effectuator at least based on the particular preselected attribute value of the first attribute. For example, referring to FIG. 1G, the objective-effectuator is configured to be made from lead. In some implementations, the objective-effectuator is associated with a set of predefined actions. In some implementations, the method 300 includes presenting the objective-effectuator at least based on the particular preselected attribute value.

Figure 3B:
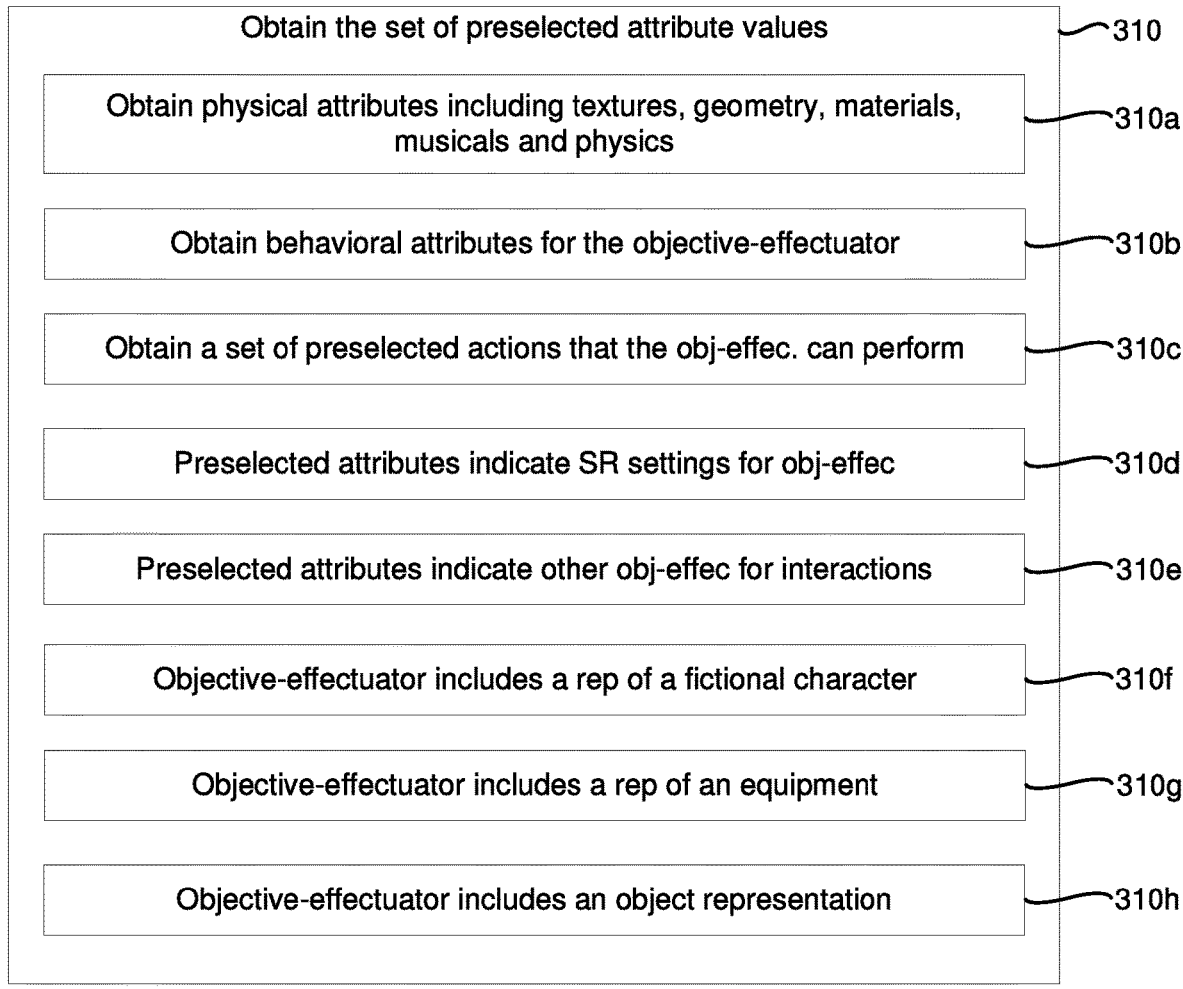

Referring to FIG. 3B, as represented by block 310a, in some implementations, the method 300 includes obtaining preselected physical attributes including preselected textures, preselected geometry, preselected materials, preselected musicals, and/or preselected physics. For example, referring to FIG. 2, in some implementations, the method 300 includes obtaining (e.g., receiving) the preselected textures 232a, the preselected geometry 232b, the preselected materials 232c, the preselected musicals, and/or the preselected physics 232e. In some implementations, the method 300 includes receiving the preselected physical attributes from an asset creator entity (e.g., the asset creator entity 230 shown in FIG. 2).

As represented by block 310b, in some implementations, the method 300 includes obtaining behavioral attributes for the objective-effectuator. For example, referring to FIG. 2, in some implementations, the method 300 includes obtaining (e.g., receiving) the preselected behavior 232f. In some implementations, the method 300 includes receiving the preselected behavioral attributes from an asset creator entity (e.g., the asset creator entity 230 shown in FIG. 2).

As represented by block 310c, in some implementations, the method 300 includes obtaining a set of preselected actions that the objective-effectuator can perform in a synthesized reality setting. In some implementations, the method 300 includes receiving the set of preselected actions from an asset creator entity (e.g., the asset creator entity 230 shown in FIG. 2) that creates the objective-effectuator.

As represented by block 310d, in some implementations, the method 300 includes obtaining preselected attributes that indicate synthesized reality settings for the objective-effectuator. In some implementations, the method 300 includes receiving types of synthesized reality settings in which the objective-effectuator can be placed. In some implementations, the method 300 includes receiving information regarding synthesized reality settings in which the objective-effectuator can be placed. For example, in some implementations, the method 300 includes receiving environmental information and/or terrain information for synthesized reality settings in which the objective-effectuator can be placed.

As represented by block 310e, in some implementations, the method 300 includes obtaining preselected attributes that indicate other objective-effectuators with which the objective-effectuator can interact. In some implementations, the method 300 receiving information indicating other character/equipment representations with which the objective-effectuator can interact.

As represented by block 310f, in some implementations, the objective-effectuator includes a representation of a character from fictional material such as a novel, a movie, a comic, etc.

As represented by block 310g, in some implementations, the objective-effectuator includes a representation of an equipment. In some implementations, the objective-effectuator is a representation of a real-world equipment, such as a fighter plane. In some implementations, the objective-effectuator is a representation of a fictional equipment, such as a time travel machine.

As represented by block 310h, in some implementations, the objective-effectuator includes an object representation that represents an object such as a person, a thing, or a place.

Figure 3C:
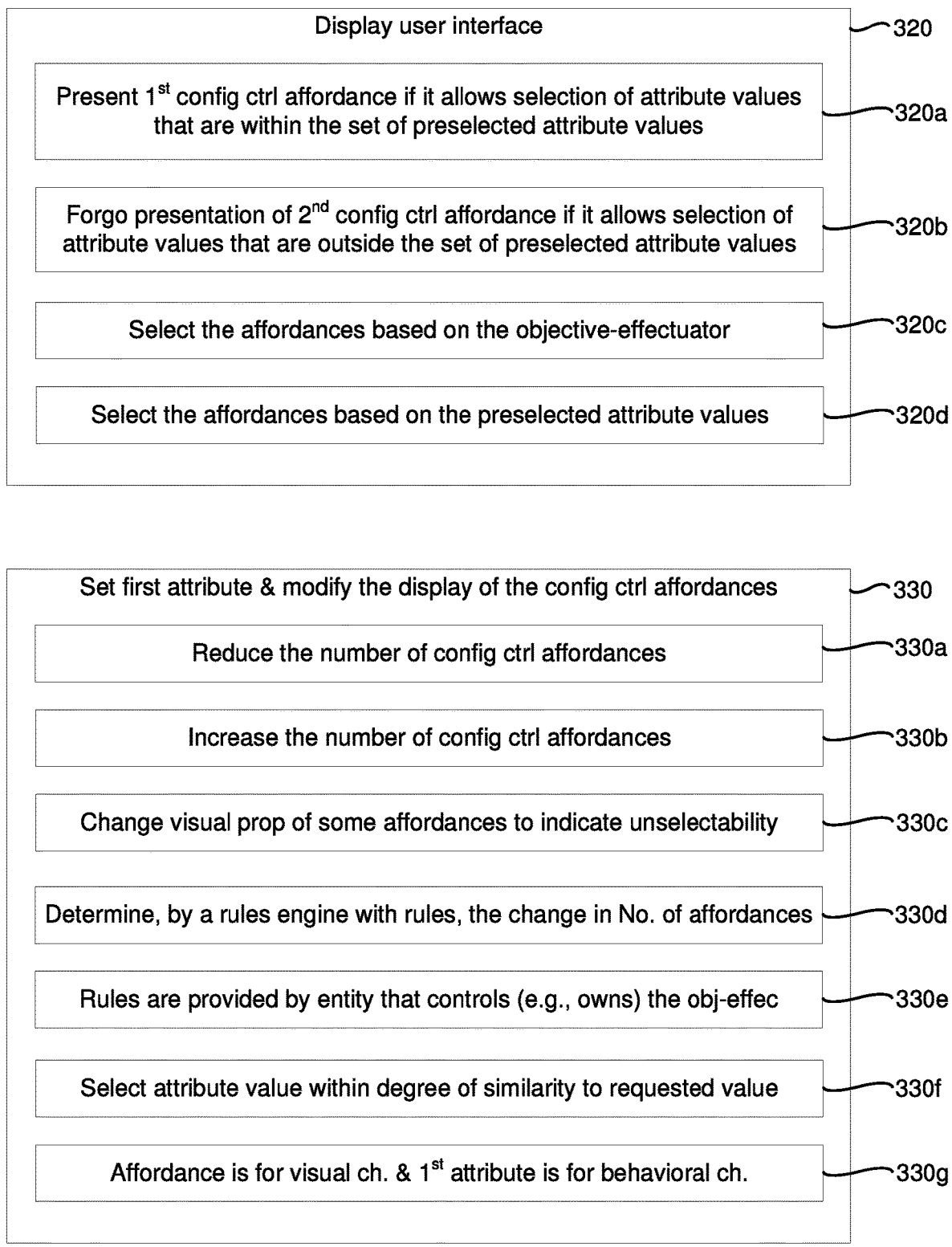

Referring to FIG. 3C, as represented by block 320a, in some implementations, the method 300 includes presenting a first configuration control affordance in response to determining that the first configuration control affordance allows selection of attribute value that are within the set of preselected attribute values.

As represented by block 320b, in some implementations, the method 300 includes forging presentation of a second configuration control affordance in response to determining that the second configuration control affordance allows selection of attribute values that are outside the set of preselected attribute values.

As represented by block 320c, in some implementations, the method 300 includes selecting the configuration control affordances based on the objective-effectuator. For example, in some implementations, the method 300 includes selecting a first set of configuration control affordances for a first objective-effectuator, and selecting a second set of configuration control affordances for a second objective-effectuator.

As represented by block 320d, in some implementations, the method 300 includes selecting the configuration control affordances based on the preselected attribute values. For example, in some implementations, the method 300 includes selecting a first set of configuration control affordances for display for a first set of preselected attribute values, and selecting a second set of configuration control affordances for display for a second set of preselected attribute values.

As represented by block 330a, in some implementations, the method 300 includes reducing the number of configuration control affordances. For example, referring to FIG. 1G, the number of movement selection affordances 120 has been reduced from three to one.

As represented by block 330b, in some implementations, the method 300 includes increasing the number of configuration control affordances. In some implementations, increasing the number of configuration control affordances provides more configuration options to the user.

As represented by block 330c, in some implementations, the method 300 includes changing a visual property of some configuration control affordances in order to indicate the unselectability of the configuration control affordances. For example, in some implementations, the method 300 includes overlaying an indicator (e.g., the unselectable affordance indicator 140 shown in FIG. 1E) on top of a configuration control affordance in order to indicate that the configuration control affordance is not selectable.

As represented by block 330d, in some implementations, the method 300 includes determining, by a rules engine, the change in the number of configuration control affordances. For example, referring to FIG. 2, the rules engine 218 determines the change in the number of configuration control affordances. In some implementations, the method 300 includes utilizing one or more rules in the rules engine to determine the change in the number of configuration control affordances. In some implementations, the method 300 includes increasing the number of configuration control affordances. In some implementations, the method 300 includes decreasing the number of configuration control affordances (e.g., as shown in FIG. 1G).

As represented by block 330e, in some implementations, the method 300 includes obtaining the rules that form the rules engine. For example, in some implementations, the method 300 includes obtaining (e.g., receiving) the rules from an entity that controls (e.g., owns) the objective-effectuator. In some implementations, the method 300 includes receiving the rules from an asset creator entity (e.g., the asset creator entity 230 shown in FIG. 2).

As represented by block 330f, in some implementations, the method 300 includes selecting attribute values that are within a degree of similarity to requested attribute values. In some implementations, the method 300 includes that the requested attribute values are not within the preselected attribute values. In such implementations, the method 300 includes selected alternative attribute values from the preselected attribute values that are within a degree of similarity to the requested attribute values.

As represented by block 330g, in some implementations, a configuration control affordance that is manipulated corresponds to a visual characteristic of the objective-effectuator, and an attribute corresponding to a behavioral characteristic is set. In some implementations, the method 300 includes receiving a selection of a configuration control affordance that relates to a first type of attribute, and setting a second type of attribute in response to selection of the configuration control affordance.

Figure 3D:
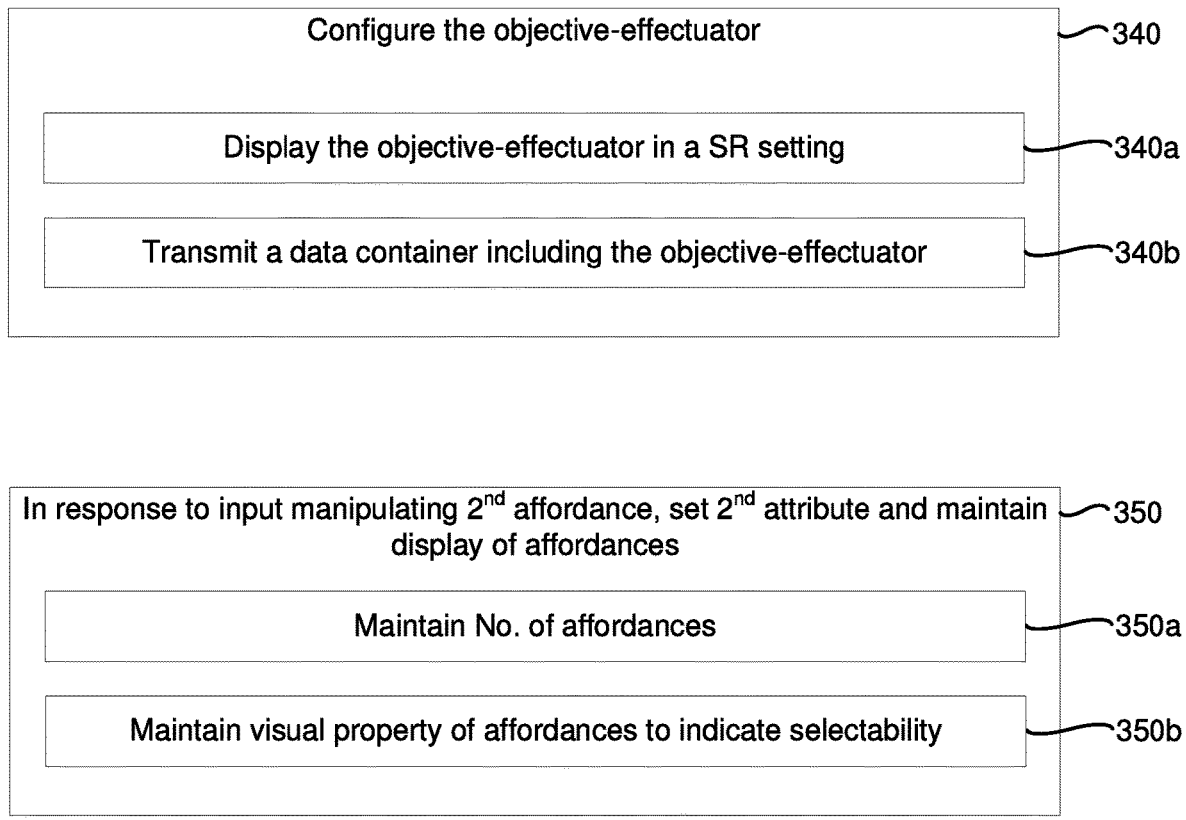

Referring to FIG. 3D, as represented by block 340a, in some implementations, the method 300 includes displaying the objective-effectuator in a synthesized reality setting. In some implementations, the method 300 includes displaying the objective-effectuator in accordance with the configuration configured via the user input.

In some implementations, the method 300 includes generating and displaying the synthesized reality setting. In some implementations, the synthesized reality setting is displayed at an electronic device such as a smartphone, a tablet, a laptop, a desktop, or the like. In some implementations, the synthesized reality setting is displayed by a head-mountable device (HMD) that can be worn by a user. In some implementations, the HMD includes a head-mountable enclosure. In some implementations, the head-mountable enclosure is shaped to form a receptacle for receiving an electronic device that has a display. In some implementations, the HMD include an integrated display.

As represented by block 340b, in some implementations, the method 300 includes transmitting a data container including the objective-effectuator. In some implementations, the method 300 includes receiving a request for the objective-effectuator. In such implementations, the method 300 includes generating the objective-effectuator, and transmitting the objective-effectuator in a data container to a device that requested the objective-effectuator.

As represented by block 350, in some implementations, the method 300 includes in response to an input manipulating a second configuration control affordance, setting a second attribute and maintaining the display of the configuration control affordances. In some implementations, the method 300 includes maintaining the number of configuration control affordances.

As represented by block 350b, in some implementations, the method 300 includes maintaining the visual property of the configuration control affordances in order to indicate the selectability of the configuration control affordances. For example, in some implementations, the method 300 includes forgoing changing the visual property of the configuration control affordances. In some implementations, the method 300 includes forgoing overlaying an indicator on a configuration control affordance that indicates that the configuration control affordance is not selectable.

Figure 4A:
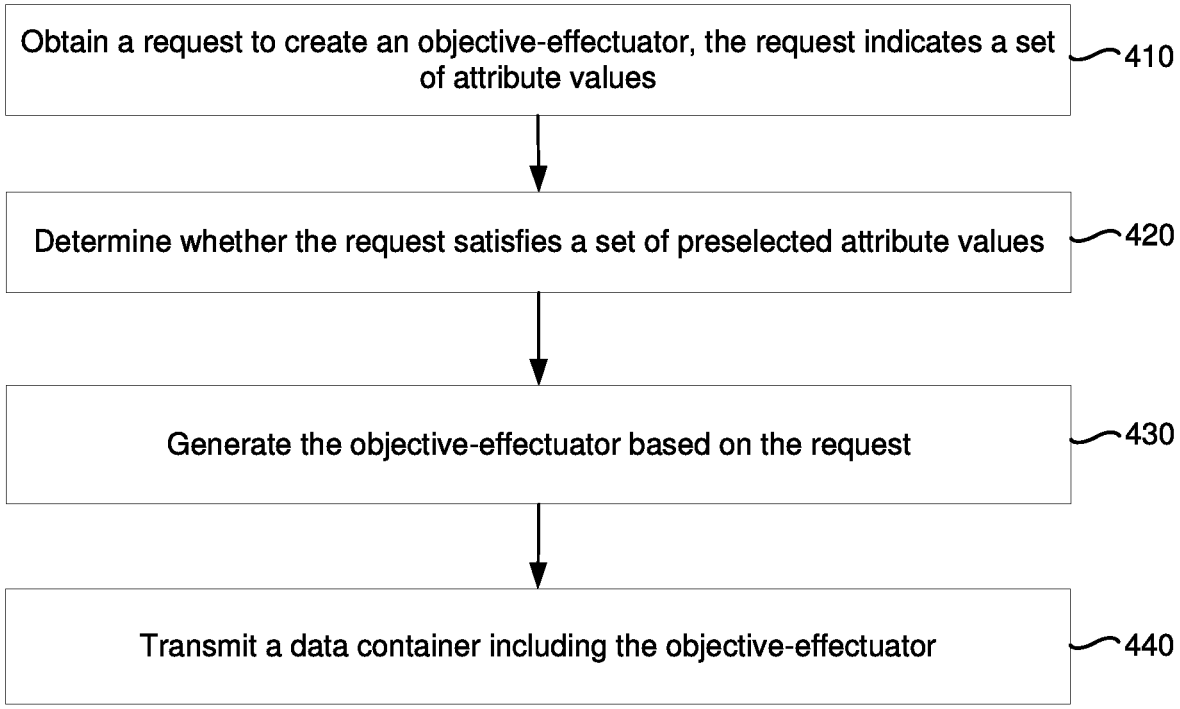
FIGS. 4A-4C are flowchart representations of a method of generating an objective-effectuator in accordance with some implementations.

FIG. 4A is a flowchart representation of a method 400 of generating an objective-effectuator for a synthesized reality setting. In various implementations, the method 400 is performed by a device with a non-transitory memory and one or more processors coupled with the non-transitory memory. In some implementations, the method 300 is performed by processing logic, including hardware, firmware, software, or a combination thereof. In some implementations, the method 400 is performed by a processor executing code stored in a non-transitory computer-readable medium (e.g., a memory). Briefly, in some implementations, the method 400 includes obtaining a request to generate an objective-effectuator, determining whether the request satisfied a set of preselected attribute values, generating the objective-effectuator, and transmitting a data container including the objective-effectuator.

As represented by block 410, in various implementations, the method 400 includes obtaining a request to create an objective-effectuator for a synthesized reality setting. In some implementations, the request indicates a set of attribute values for the objective-effectuator.

As represented by block 420, in some implementations, the method 400 includes determining whether the request satisfies a set of preselected attribute values for the objective-effectuator. For example, in some implementations, the method 400 includes determining whether the set of attribute values indicated in the request satisfy the set of preselected attribute values for the objective-effectuator.

As represented by block 430, in some implementations, the method 400 includes generating the objective-effectuator based on the request. For example, in some implementations, the method 400 includes in response to determining that the set of attribute values indicated in the request satisfy the set of preselected attribute values for the objective-effectuator, generating the objective-effectuator based on the set of attribute values indicated in the request.

As represented by block 440, in some implementations, the method 400 includes transmitting a data container including the objective-effectuator. In some implementations, the method 400 includes encapsulating the objective-effectuator in a HTML wrapper.

Figure 4B:
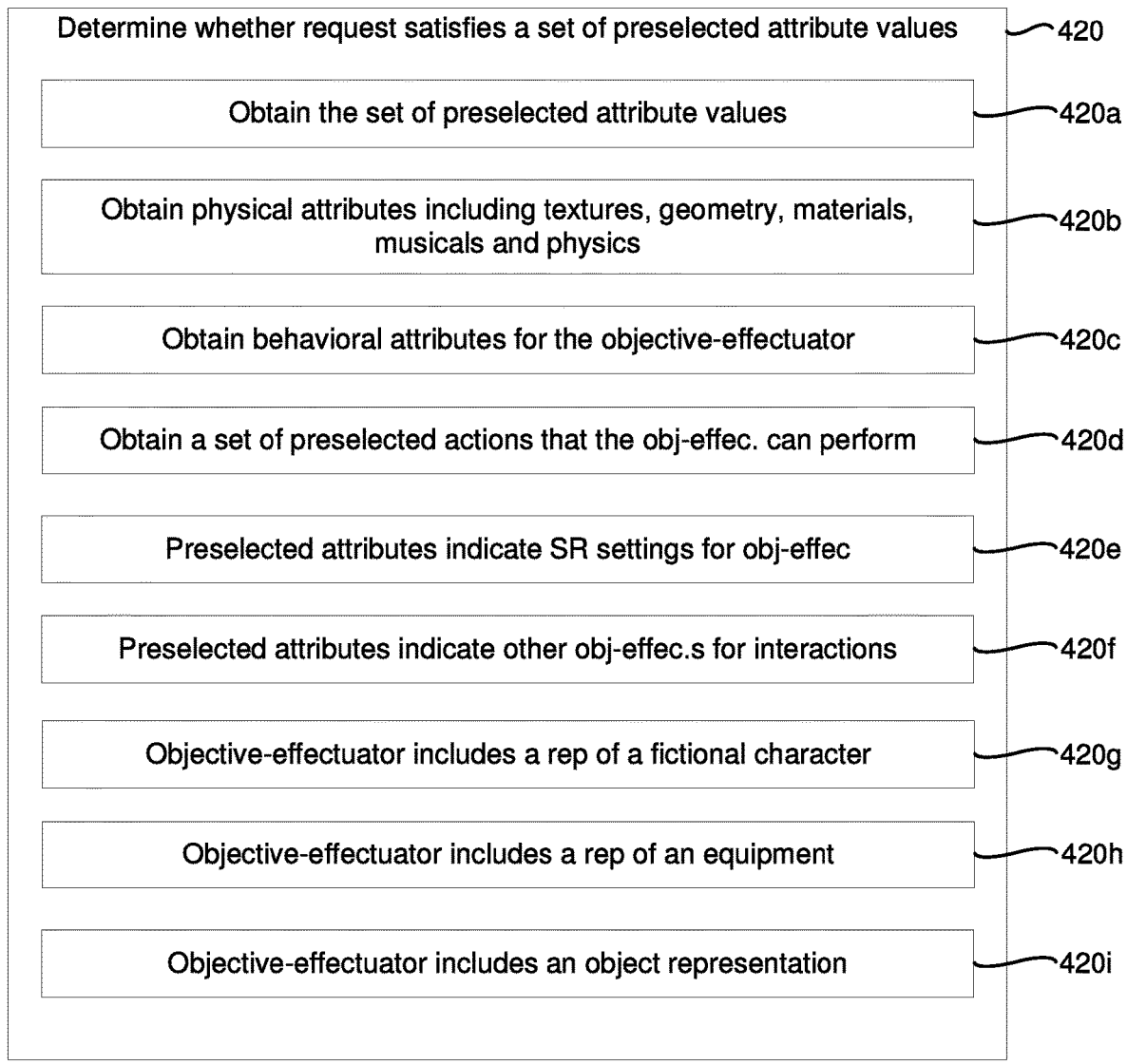

Referring to FIG. 4B, as represented by block 420a, in some implementations, the method 400 includes obtaining the set of preselected attribute values. In some implementations, the method 400 includes receiving the set of preselected attribute values from an asset creator entity that creates an asset corresponding to the objective-effectuator.

As represented by block 420b, in some implementations, the method 400 includes obtaining preselected physical attributes including preselected textures, preselected geometry, preselected materials, preselected musicals, and/or preselected physics. For example, referring to FIG. 2, in some implementations, the method 400 includes obtaining (e.g., receiving) the preselected textures 232a, the preselected geometry 232b, the preselected materials 232c, the preselected musicals, and/or the preselected physics 232e. In some implementations, the method 400 includes receiving the preselected physical attributes from an asset creator entity (e.g., the asset creator entity 230 shown in FIG. 2).

As represented by block 420c, in some implementations, the method 400 includes obtaining behavioral attributes for the objective-effectuator. For example, referring to FIG. 2, in some implementations, the method 400 includes obtaining (e.g., receiving) the preselected behavior 232f. In some implementations, the method 400 includes receiving the preselected behavioral attributes from an asset creator entity (e.g., the asset creator entity 230 shown in FIG. 2).

As represented by block 420d, in some implementations, the method 400 includes obtaining a set of preselected actions that the objective-effectuator can perform in a synthesized reality setting. In some implementations, the method 400 includes receiving the set of preselected actions from an asset creator entity (e.g., the asset creator entity 230 shown in FIG. 2) that creates the objective-effectuator.

As represented by block 420e, in some implementations, the method 400 includes obtaining preselected attributes that indicate synthesized reality settings for the objective-effectuator. In some implementations, the method 400 includes receiving types of synthesized reality settings in which the objective-effectuator can be placed. In some implementations, the method 400 includes receiving information regarding synthesized reality settings in which the objective-effectuator can be placed. For example, in some implementations, the method 400 includes receiving environmental information and/or terrain information for synthesized reality settings in which the objective-effectuator can be placed.

As represented by block 420f, in some implementations, the method 400 includes obtaining preselected attributes that indicate other objective-effectuators with which the objective-effectuator can interact. In some implementations, the method 400 receiving information indicating other character/equipment representations with which the objective-effectuator can interact.

As represented by block 420g, in some implementations, the objective-effectuator includes a representation of a character from fictional material such as a novel, a movie, a comic, etc.

As represented by block 420h, in some implementations, the objective-effectuator includes a representation of an equipment. In some implementations, the objective-effectuator is a representation of a real-world equipment, such as a fighter plane. In some implementations, the objective-effectuator is a representation of a fictional equipment, such as a time travel machine.

As represented by block 420i, in some implementations, the objective-effectuator includes an object representation that represents an object such as a person, a thing, or a place.

Figure 4C:
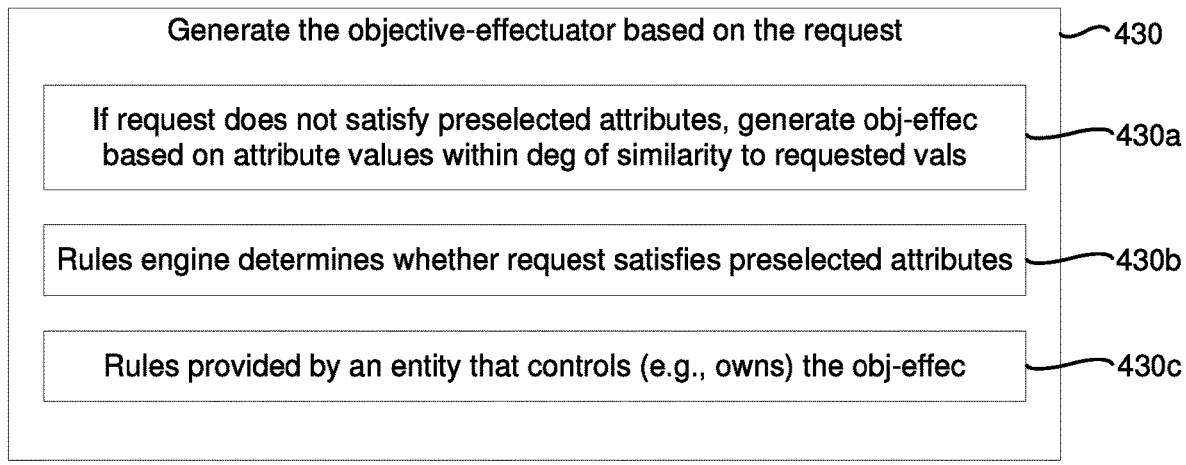

Referring to FIG. 4C, as represented by block 430a, in some implementations, the method 400 includes in response to determining that the requested attribute values do not satisfy the set of preselected attributes, generating the objective-effectuator based on alternative attribute values from the set of preselected attributes that are within a degree of similarity to the requested attribute values.

As represented by block 430b, in some implementations, the method 400 includes, determining, by a rules engine (e.g., the rules engine 218 shown in FIG. 2), whether the request satisfies the preselected attributes.

As represented by block 430c, in some implementations, the method 400 includes obtaining (e.g., receiving) the rules that form the rules engine. In some implementations, the method 400 includes receiving the rules from an asset creator entity that creates the asset represented by the objective-effectuator.

Figure 5:
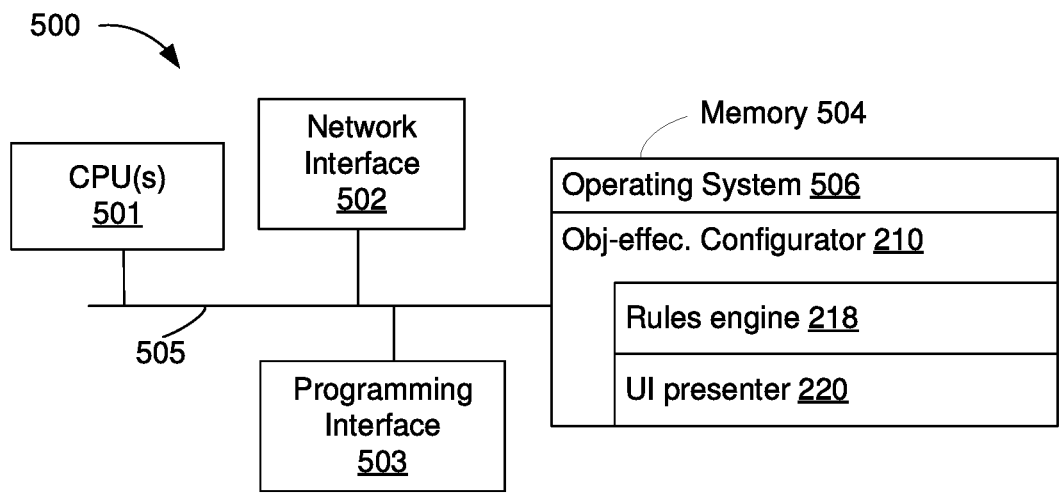
FIG. 5 is a block diagram of a server system that configures an objective-effectuator in accordance with some implementations.

FIG. 5 is a block diagram of a server system 500 enabled with one or more components of a device in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the server system 500 includes one or more processing units (CPUs) 501, a network interface 502, a programming interface 503, a memory 504, and one or more communication buses 505 for interconnecting these and various other components.

In some implementations, the network interface 502 is provided to, among other uses, establish and maintain a metadata tunnel between a cloud hosted network management system and at least one private network including one or more compliant devices. In some implementations, the communication buses 505 include circuitry that interconnects and controls communications between system components. The memory 504 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 504 optionally includes one or more storage devices remotely located from the CPU(s) 501. The memory 504 comprises a non-transitory computer readable storage medium.

In some implementations, the memory 504 or the non-transitory computer readable storage medium of the memory 504 stores the following programs, modules and data structures, or a subset thereof including an optional operating system 506, the objective-effectuator configurator 210 that includes the rules engine 218 and the user interface presenter 220. As described herein, the objective-effectuator 210 allows a user to configure an objective-effectuator while enabling an asset creator that creates the corresponding asset to enforce restrictions on the configurations. As described herein, the rules engine 218 includes one or more rules that determine the available configurations for the objective-effectuator. As described herein, the user interface presenter 220 presents a user interface that allows a user to configure the objective-effectuator.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    at a device including a display, a non-transitory memory and one or more processors coupled with the display and the non-transitory memory:
        obtaining a request to display a user interface for generating an objective-effectuator that is to be placed in an environment;
        displaying the user interface including a plurality of configuration control affordances that correspond to a set of selectable attribute values for the objective-effectuator, wherein the selectable attribute values correspond to respective materials that can be selected for the objective-effectuator;
        obtaining a rule that restricts configuration of the objective-effectuator in the environment, wherein the rule restricts selection of a subset of the materials when a temperature of the environment is greater than a threshold while allowing selection of a remainder of the materials;
        obtaining information regarding other objective-effectuators that are in the environment and a weather of the environment;
        determining, based on the rule and the other objective-effectuators that are in the environment, that a subset of the set of selectable attribute values remain selectable while a remainder of the set of selectable attribute values are no longer selectable; and
        prior to displaying the objective-effectuator in the environment, modifying the user interface such that a subset of the plurality of configuration control affordances corresponding to the subset of the set of selectable attribute values remain selectable and a remainder of the plurality of configuration control affordances corresponding to the remainder of the set of selectable attribute values become unselectable in order to restrict configuration of the objective-effectuator in the environment in accordance with the rule.

2. The method of claim 1, wherein the set of selectable attribute values comprises physical attributes including one or more of textures, geometry, materials, musicals or physics.

3. The method of claim 1, wherein the set of selectable attribute values comprises behavioral attributes for the objective-effectuator.

4. The method of claim 1, wherein the set of selectable attributes comprises a set of preselected actions performable by the objective-effectuator.

5. The method of claim 1, wherein the set of selectable attributes indicates settings for the environment in which the objective-effectuator is being placed.

6. The method of claim 1, wherein the rule restricts selection of the materials based on a behavior of the other objective-effectuators that are in the environment.

7. The method of claim 6, wherein the information regarding the other objective-effectuators indicates that at least one of the other objective-effectuators in the environment is hostile;
wherein the rule restricts selection of a subset of the materials that does not protect the objective-effectuator from the at least one of the other objective-effectuators that is hostile and the rule allows selection of a remainder of the materials that protect the objective-effectuator from the at least one of the other objective-effectuators that is hostile;
wherein the subset of the plurality of configuration control affordances that are made unselectable corresponds to the subset of the materials that do not protect the objective-effectuator from the at least one of the other objective-effectuators that is hostile; and
wherein the remainder of the plurality of configuration control affordances that remain selectable correspond to the remainder of the materials that protect the objective-effectuator from the at least one of the other objective-effectuators that is hostile.

8. The method of claim 1, wherein obtaining the information regarding the other objective-effectuators that are in the environment comprises obtaining information regarding the environment.

9. The method of claim 1, wherein the subset of the plurality of configuration control affordances that are made unselectable corresponds to the subset of the materials that are not suitable when the temperature is greater than the threshold; and
wherein the remainder of the plurality of configuration control affordances that remain selectable correspond to the remainder of the materials that are suitable when the temperature is greater than the threshold.

10. The method of claim 1, further comprising obtaining information regarding a terrain of the environment; and
wherein the rule restricts selection of the set of selectable attribute values based on the terrain of the environment.

11. The method of claim 1, further comprising:
after modifying the user interface, detecting a selection of one or more of the configuration control affordances from the subset of the plurality of configuration control affordances that remain selectable;
generating the objective-effectuator based on the selection of the one or more of the configuration control affordances from the subset of the plurality of configuration control affordances that remain selectable; and
after generating the objective-effectuator, displaying the objective-effectuator in the environment.

12. A device comprising:
one or more processors;
a non-transitory memory;
one or more displays; and
one or more programs stored in the non-transitory memory, which, when executed by the one or more processors, cause the device to:
obtain a request to display a user interface for generating an objective-effectuator that is to be placed in an environment;
display the user interface including a plurality of configuration control affordances that correspond to a set of selectable attribute values for the objective-effectuator, wherein the selectable attribute values correspond to respective materials that can be selected for the objective-effectuator;
obtain a rule that restricts configuration of the objective-effectuator in the environment, wherein the rule restricts selection of a subset of the materials when a temperature of the environment is greater than a threshold while allowing selection of a remainder of the materials;
obtain information regarding other objective-effectuators that are in the environment and a weather of the environment;
determine, based on the rule and the other objective-effectuators that are in the environment, that a subset of the set of selectable attribute values remain selectable while a remainder of the set of selectable attribute values are no longer selectable; and
prior to displaying the objective-effectuator in the environment, modify the user interface such that a subset of the plurality of configuration control affordances corresponding to the subset of the set of selectable attribute values remain selectable and a remainder of the plurality of configuration control affordances corresponding to the remainder of the set of selectable attribute values become unselectable in order to restrict configuration of the objective-effectuator in the environment in accordance with the rule.

13. The device of claim 12, wherein the rule restricts selection of the materials based on a behavior of the other objective-effectuators that are in the environment.

14. The device of claim 13, wherein the information regarding the other objective-effectuators indicates that at least one of the other objective-effectuators in the environment is hostile;
wherein the rule restricts selection of a subset of the materials that do not protect the objective-effectuator from the at least one of the other objective-effectuators that is hostile and the rule allows selection of a remainder of the materials that protect the objective-effectuator from the at least one of the other objective-effectuators that is hostile;
wherein the subset of the plurality of configuration control affordances that are made unselectable corresponds to the subset of the materials that do not protect the objective-effectuator from the at least one of the other objective-effectuators that is hostile; and
wherein the remainder of the plurality of configuration control affordances that remain selectable correspond to the remainder of the materials that protect the objective-effectuator from the at least one of the other objective-effectuators that is hostile.

15. A non-transitory memory storing one or more programs, which, when executed by one or more processors of a device with a display, cause the device to:
obtain a request to display a user interface for generating an objective-effectuator to be placed in an environment;
display the user interface including a plurality of configuration control affordances that correspond to a set of selectable attribute values for the objective-effectuator, wherein the selectable attribute values correspond to respective materials that can be selected for the objective-effectuator;

obtain a rule that restricts configuration of the objective-effectuator in the environment wherein the rule restricts selection of a subset of the materials when a temperature of the environment is greater than a threshold while allowing selection of a remainder of the materials;

obtain information regarding other objective-effectuators that are in the environment and a weather of the environment;

determine, based on the rule and the other objective-effectuators that are in the environment, that a subset of the set of selectable attribute values remain selectable while a remainder of the set of selectable attribute values are no longer selectable; and prior to displaying the objective-effectuator in the environment, modify the user interface such that a subset of the plurality of configuration control affordances corresponding to the subset of the set of selectable attribute values remain selectable and a remainder of the plurality of configuration control affordances corresponding to the remainder of the set of selectable attribute values become unselectable in order to restrict configuration of the objective-effectuator in the environment in accordance with the rule.

16. The non-transitory memory of claim 15, wherein the subset of the plurality of configuration control affordances that are made unselectable corresponds to the subset of the materials that are not suitable when the temperature is greater than the threshold; and wherein the remainder of the plurality of configuration control affordances that remain selectable correspond to the remainder of the materials that are suitable when the temperature is greater than the threshold.

* * * * *